Apr. 10, 1923.

R. E. MILLER

AUTOMATIC WINDSHIELD CLEANING DEVICE

Filed Oct. 16, 1920

1,451,368

Inventor
Richard E. Miller
By Fay, Oberlin & Fay
Attorneys

Patented Apr. 10, 1923.

1,451,368

UNITED STATES PATENT OFFICE.

RICHARD E. MILLER, OF BAY VILLAGE, OHIO.

AUTOMATIC WINDSHIELD-CLEANING DEVICE.

Application filed October 16, 1920. Serial No. 417,857.

*To all whom it may concern:*

Be it known that I, RICHARD E. MILLER, a citizen of the United States, and a resident of Bay Village, county of Cuyahoga, and State of Ohio, have invented a new and useful Improvement in Automatic Windshield-Cleaning Devices, of which the following is a specification, the principle of the invention being herein explained and the best mode in which I have contemplated applying that principle, so as to distinguish it from other inventions.

The present invention relates to improvements in windshield cleaners adapted to be electrically operated. It also contemplates a device operated by a solenoid type of motor, provision being made whereby the actual wiping of the glass is intermittently and quickly accomplished, the intervals between movements of the wiper being of sufficient duration so that the wiper does not interfere with the operator's vision. Further provision is made whereby the device may be quickly attached to or removed from a windshield and connected to the usual battery or other current source. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
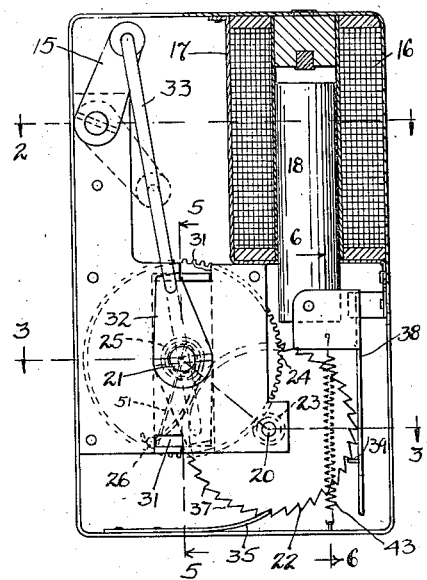
Figure 2:
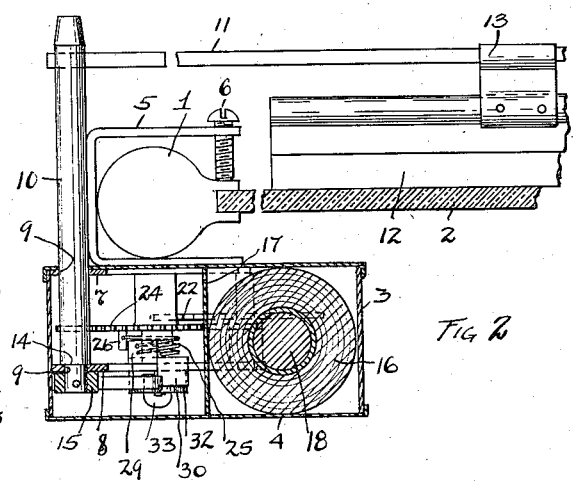
Figure 3:
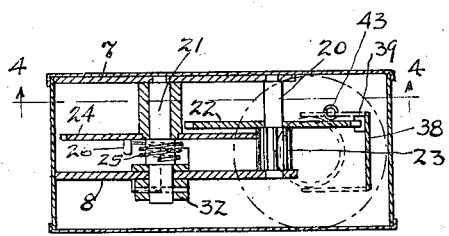
Figure 4:
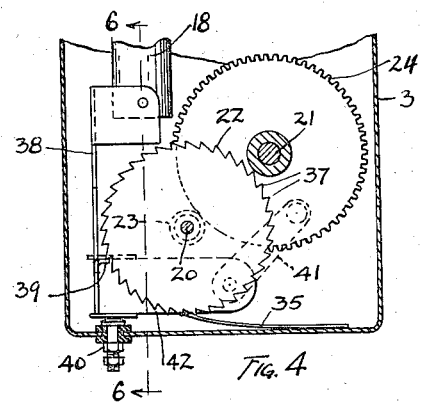
Figure 5:
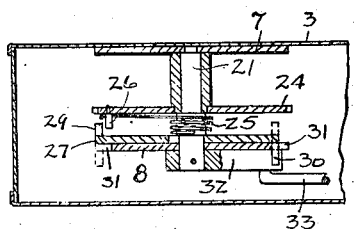
Figure 6:
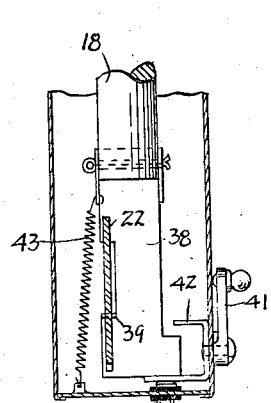
Figure 7:
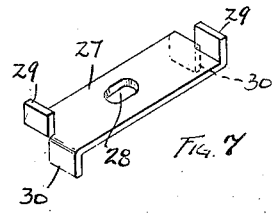

Fig. 1 is a plan view of the casing and mechanism with the cover removed and parts in section; Fig. 2 is a section on the line 2—2 of Fig. 1 but showing the device attached to a windshield; Fig. 3 is a section on the line 3—3 of Fig. 1 to show the driving mechanism; Fig. 4 is a section on the line 4—4 of Fig. 3; Fig. 5 is a section on the line 5—5 of Fig. 1; Fig. 6 is a section on the line 6—6 of Fig. 4; and Fig. 7 is a perspective view of a detail.

As best shown in Fig. 2, the present device is adapted to be attached to a vehicle windshield having a frame 1 carrying the usual plate glass 2, the device consisting of a casing 3 having a cover 4, the casing being provided with a clamp member 5 adapted to receive the windshield frame and to be secured thereto by a set screw 6 or the like.

Within the casing are mounted two bearing plates 7 and 8 which have suitable aligned apertures 9 near the upper end of the case to receive a rod 10 which extends outwardly of the casing over the clamp member and which has a wiper supporting arm 11 attached to its outer end carrying the rubber wiper or clearer 12 by means of a clamp or clip 13 in the usual manner. This rod has a reduced end passing through the inner plate 8, the shoulder 14 of the rod acting as a thrust bearing. The reduced end back of the plate has an operating arm 15 pinned or secured thereto, the arm acting to hold the rod in place in the bearing plates.

The operating mechanism consists of a suitable coil 16 mounted in one corner of the casing and held in place by means of a strap 17 suitably riveted or otherwise attached to the casing wall. Within this coil is reciprocably mounted a plunger 18. This coil will be connected to the vehicle storage battery or other source of current supply through make and break mechanism to be described in detail hereinafter.

The driving mechanism for the rod and windshield wiper consists of two shafts 20 and 21 mounted through the bearing plates 7 and 8, the shaft 20 being provided with a large ratchet wheel 22 and a spur gear 23 which is in mesh with a large gear 24 loosely mounted on shaft 21.

A coiled spring 25 is mounted around this shaft back of the large gear 24 and is attached at one end to the gear 24 by means of a pin 26 through the shank of which it is fastened. The spring is also attached to the shaft 21 which is itself rotatably mounted in the bearing plates. The spring extends through the shaft and has a bent end 51 which extends outwardly engaging with the pin to help act as a stop. Between the spring and the bearing plate 8 is mounted a two-way dog 27 which is clearly shown in Fig. 7. This dog is provided with an elongated aperture 28 through which the shaft 21 passes and has two upstanding lugs 29 and two downwardly turned lugs 30, the upstanding lugs being adapted to be engaged by the pin 26 which holds the spring so that as the gear 24 is turned, the pin will engage with first one and then the other of these lugs 29 to move the dog longitudinally. The other two lugs 30 extend through suitable apertures 31 in the bearing plate 8 and are adapted to act as stops for a driving arm 32 which is pinned to the shaft 21 and which acts as the driving arm for the wiper. This arm is connected to the arm 15 carried by the rod by means of a link 33.

The ratchet wheel 22 which is mounted on the other shaft is rotatable in one direction only, a spring latch 35 being attached to the casing and engaging the ratchet teeth 37 to prevent return movement. Pivotally attached to the plunger is an arm 38 having a pawl 39 adapted to engage with the ratchet teeth to turn the ratchet wheel upon inward movement of the plunger.

The make and break mechanism for the coil is operated by this same pivoted arm 38 attached to the plunger, the coil being grounded to the case and having the other connection made through a contact screw 40 mounted through the case but insulated therefrom. On the cover of the case is mounted a switch handle 41 controlling the circuit and on the interior of the case is mounted a channel contact member 42 which is normally spaced above the contact screw 40 in the end of the case. This contact member is adapted to be moved into contact with the screw by means of the pivoted arm connected to the plunger. The plunger is normally maintained in its outwardly contacting position by means of a small spring 43 connected to the arm and to the case. When the circuit is made by means of the switch arm, the plunger being in its normally outward position, the circuit is completed through the coil which moves the plunger inwardly until the arm engages the upper end of the channel contact which moves the lower channel arm away from the contact screw thus breaking the circuit and allowing the plunger to be returned to its contact making position by means of the spring before mentioned.

Thus when the circuit is once made, the plunger continues to move in and out, operating the ratchet wheel and thus driving the large gear through the small gear rotatably mounted on the same shaft with the ratchet wheel. Movement of this large gear is adapted to wind up the coiled spring until the gear has made one-half revolution at which time the pin which holds the spring to the gear contacts with one of the ends of the dog thus moving the dog, and allowing the driving arm to be rotated by the spring. Movement of the dog in one direction causes the other lug to be brought into engagement with the driving arm as soon as the latter has rotated 180 degrees or one-half revolution. To prevent sudden stopping of the device by means of the lugs, the extending end 51 of the spring puts pressure upon the pin before the arm strikes the dog, and as the spring extends through the shaft this stops the shaft from further rotation except through slightly bending the spring. As the gear rotates continuously the pin is quickly moved around allowing the arm to move slightly into contact with the stop. The gear and pin thus continue to be revolved by the ratchet wheel until they have again turned one-half revolution so that the pin will engage the lug on the other end of the dog again releasing the driving arm to allow another one-half revolution of the same.

The driving arm and the link 33 which connects this to the arm carried by the rod is so arranged that a half revolution of this driving arm rotates the rod sufficiently to move the wiper across the glass. In this way through the action of a pulsating or intermittent motor the wiper is moved intermittently back and forth across the glass of the windshield, the actual wiping movement being made quickly after which there is a break before the return movement of the wiper. The time between movements of the wiper can be regulated or predetermined so that the wiper will usually move about once in fifteen seconds which interval has been found to keep the windshield clean and yet sufficient so that the vision of the operator is not unduly disturbed by the movement of the wiper. The interval of time may, of course, be varied by changing the gear ratios or by varing the movement of the plunger and thus the distance it moves the ratchet wheel for one stroke.

It will be noted that under light loads the wiper will be operated as above described, that is by accumulating the motor impulses to a certain amount and then releasing the wiper until it snaps across its full range of motion over the windshield. Under heavy loads, however, when the wiper arm is released it drags slowly and the spring distributes the impulses of the motor and prevents the formation of water ridges across the path of motion of the wiper. It is impossible to operate a wiper from a solenoid type of motor through a direct gear reduction without obtaining water ridges on the windshield for each impulse of the coil, and as there are several impulses of the coil to one stroke of the wiper, a series of radial water ridges would be formed over the area traversed by said wiper. Such water ridges are very objectionable and are particularly dangerous in night driving.

It will be seen that by using a make and break mechanism for the coil that the current consumption is not continuous and may be kept down to a minimum, while the wiper may be actuated to clean the glass positively and quickly and at suitable intervals. The coil spring will be of sufficient strength to positively move the wiper under all normal conditions and the wiper may be set so that the glass will be kept clean at all times.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a windshield cleaning device, the combination of a support adapted to be attached to a windshield, a wiper arm actuating shaft rotatably mounted upon said support, a wiper arm associated with one end of said shaft, a crank arm associated with the other end of said shaft, a spring motor connected with said crank arm, means for tensioning the spring of said motor, and automatic means for releasing said spring to permit said motor to operate.

2. In a windshield cleaning device, the combination of a support adapted to be attached to a windshield, a wiper arm actuating shaft rotatably mounted upon said support, a wiper arm associated with one end of said shaft, a crank arm associated with the other end of said shaft, a spring operatively associated with said crank arm, a stop for said crank arm, and means adapted to move one end of said spring to place the same under tension and thereafter to release said stop.

3. In a windshield cleaning device, the combination of a support adapted to be attached to a windshield, a wiper arm actuating shaft rotatably mounted upon said support, a wiper arm associated with one end of said shaft, a crank arm associated with the other end of said shaft, operating means for oscillating said crank arm releasable means for restraining said operating means, and automatic means for intermittently rendering ineffective said restraining means.

4. In a windshield cleaning device, the combination of a support adapted to be attached to a windshield, wiper arm actuating means movably mounted upon said support, a wiper arm associated with said actuating means, power accumulating means adapted for driving said actuating means, means for storing power in said power accumulating means, and automatic means operable after a predetermined accumulation of power in said accumulating means for releasing said power for operating said wiper actuating means.

5. In a windshield cleaning device the combination of a support adapted to be attached to a windshield, wiper arm actuating means movably mounted upon said support, a wiper arm associated with said actuating means, a spring motor connected with said actuating means, means for tensioning the spring of said motor, and automatic means actuated only after a predetermined number of tensioning operations for releasing the spring to permit the same to operate said actuating means.

6. A windshield cleaner comprising a wiper supported to swing in opposite directions, a motor, and connections between said motor and wiper for intermittently moving said wiper in opposite directions at a speed independent of the speed of said motor.

7. A windshield cleaner comprising an oscillatible element, a wiper connected with said element, a motor, and means connecting said oscillatible element and said motor for accumulating the energy of said motor over certain periods of time and using said energy to move said oscillatible element alternately in opposite directions in a shorter period of time.

8. A windshield cleaner comprising a wiper supported to have a range of motion over the windshield, a motor having a reciprocating part, and connections between said part and wiper to actuate said wiper, including means for distributing the separate impulses of the motor, for moving the wiper through its full range of motion at substantially uniform speed.

Signed by me, this 6th day of October, 1920.

RICHARD E. MILLER.